(12) United States Patent
Thibodeau

(10) Patent No.: US 11,305,475 B1
(45) Date of Patent: Apr. 19, 2022

(54) STRETCH ROD FOR INFLATING A PREFORM

(71) Applicant: DT Inventions, Houston, TX (US)

(72) Inventor: James Alfred Thibodeau, Houston, TX (US)

(73) Assignee: DT Inventions, Houston, TX (US)

( * ) Notice: Subject to any disclaimer, the term of this patent is extended or adjusted under 35 U.S.C. 154(b) by 0 days.

(21) Appl. No.: 17/071,339

(22) Filed: Oct. 15, 2020

(51) Int. Cl.
*B29C 49/12* (2006.01)

(52) U.S. Cl.
CPC ...... *B29C 49/12* (2013.01); *B29C 2049/1228* (2013.01); *B29C 2049/1238* (2013.01); *B29C 2049/1257* (2013.01)

(58) Field of Classification Search
None
See application file for complete search history.

(56) References Cited

U.S. PATENT DOCUMENTS

| 4,254,079 A * | 3/1981 | Agrawal | B29C 49/08 264/537 |
| 4,280,805 A * | 7/1981 | Hafele | B29C 49/0073 264/538 |
| 5,585,065 A * | 12/1996 | Nakamaki | B29C 49/649 264/521 |

* cited by examiner

*Primary Examiner* — Monica A Huson
(74) *Attorney, Agent, or Firm* — Osha Bergman Watanabe & Burton LLP

(57) ABSTRACT

A stretch rod for blowing a preform into a container is disclosed. The stretch rod includes a hollow, cylindrical body that is made of metal, a first plurality of apertures, and a second plurality of apertures. The body of the stretch rod includes a handle pocket zone with the first plurality of apertures and an optional zone disposed on the stretch rod below the handle pocket zone, the optional zone including the second plurality of apertures. Compressed air is blown through the first plurality of apertures and the second plurality of apertures of the stretch rod to form the blown container.

18 Claims, 4 Drawing Sheets

STRETCH ROD FOR INFLATING A PREFORM

FIELD OF THE INVENTION

The present invention relates to a method and device for forming a container. More specifically, the present invention relates to a method and device for forming a container from a preform with a stretch rod with one or more apertures through which compressed air is blown.

BACKGROUND OF THE INVENTION

Conventionally, numerous types of containers, including plastic bottles for holding fluids, are formed by blow-molding. An exemplary process can produce a plastic bottle, for example, a PET bottle. Such a bottle can be produced from a preform which has an elongated cylindrical body, which is connected to a neck section with a pour opening, in which the preform, which has been produced in a plastic injection process or an extrusion process, is placed in the mold cavity of a blow mold and inflated using a blow nozzle by an injection blow molding or injection stretch blow molding process.

The stretching of the preform is performed with a stretch rod inserted into the preform. The stretch rod has a stretch rod body that extends into the preform, to the bottom curved part of the preform. The tip of the stretch rod body pushes on the semi-spherical end portion of the preform and stretches the preform, which has been heated, to form a stretched preform.

BRIEF SUMMARY OF THE INVENTION

In general, in one aspect, the invention relates to a stretch rod for blowing a preform into a container, the stretch rod comprising a hollow, cylindrical body that is made of metal, a first plurality of apertures, and a second plurality of apertures, the body of the stretch rod comprising a handle pocket zone comprising the first plurality of apertures and an optional zone disposed on the stretch rod below the handle pocket zone, the optional zone comprising the second plurality of apertures, wherein compressed air is blown through the first plurality of apertures and the second plurality of apertures of the stretch rod to form the blown container.

In general, in one aspect, the invention relates to a method for blowing a heated preform into a container, comprising inserting a stretch rod into the heated preform until the bottom of the stretch rod directly contacts a curved, semi-spherical end portion of the preform, as the stretch rod is inserted, stretching the preform to its container length until the preform touches a base of a blow mold in which the preform is encompassed, directing compressed air through a first plurality of apertures of the stretch rod in a handle pocket zone, between an upper attachment point and a lower attachment point of an integral handle of the preform, forming a shelf of the container, and directing compressed air through a second plurality of apertures of the stretch rod in an optional zone disposed below the handle pocket zone, forming a remainder of the container from the preform.

In general, in one aspect, the invention relates to a method for blowing a preform into a container, comprising heating the preform to obtain a heated preform, inserting the preform into a blow mold and closing the blow mold such that the blow mold encompasses the preform, inserting a stretch rod into the heated preform until the bottom of the stretch rod directly contacts a curved, semi-spherical end portion of the preform, as the stretch rod is inserted, stretching the preform until the preform touches a base of the blow mold, directing low pressure air, in a preblow cycle, through a blow nozzle that seals the heated preform, and directing high pressure compressed air through a plurality of apertures arranged on the stretch rod to obtain a blown container.

In general, in one aspect, the invention relates to an apparatus comprising a heated preform, a blow mold for receiving the heated preform, a blow nozzle for sealing the heated preform in the blow mold, and a stretch rod. The stretch rod has a hollow, cylindrical body that is made of metal, and a first plurality of apertures arranged on the body of the stretch rod. Compressed air is blown through the first plurality of apertures to form a blown container.

BRIEF DESCRIPTION OF THE DRAWINGS

Without restricting the full scope of this invention, the preferred form of this invention is illustrated in the following drawings.

DETAILED DESCRIPTION OF THE INVENTION

Figure 1:
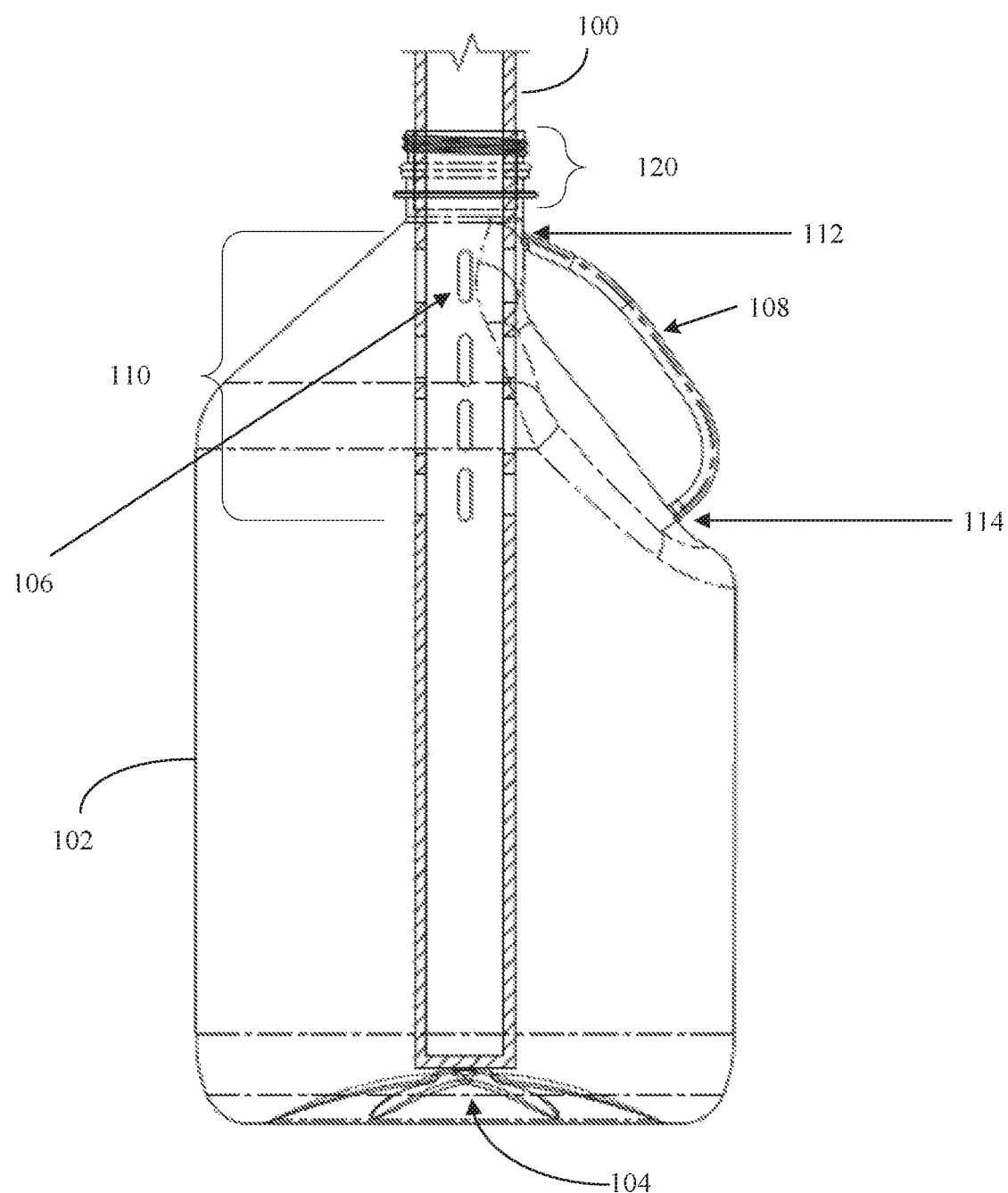
FIG. 1 shows a stretch rod with slots inserted into a preform in accordance with one or more embodiments disclosed herein.

The following description is demonstrative in nature and is not intended to limit the scope of the invention or its application of uses. There are a number of significant design features and improvements incorporated within the invention.

Injection blow molding is used for the production of hollow objects in large quantities. The main applications are bottles, jars, and other containers. These containers may be, for example, half-gallon, gallon, or any other suitable size containers. In a pre-injection stage, the polymer is fed into the extruder and plasticizes plastic pellets into molten polymer. In an injection stage, the molten polymer is fed into a manifold where it is injected through nozzles into a hollow preform mold. The preform mold forms the external shape and is clamped around a core rod which forms the internal shape of the preform. Next, in a blowing stage, the preform mold opens and the core rod is rotated and clamped into the hollow, chilled blow mold. The core rod opens and allows compressed air into the preform, which inflates into the finished product shape. After the cooling cycle, the blow mold opens and the core rod is rotated to the ejection position. The finished product is ejected off the core rod.

Stretch blow molding is a modification of the injection blow molding process and is also referred to as injection stretch blow molding (ISBM). Stretch blow molding processes produce biaxial orientation in the blown article. Stretch blow molding provides for axial orientation by stretching the preform axially before or during blowing. This is accomplished by a stretch rod that is advanced axially inside the preform at a controlled rate. Stretch blow molding is divided into two different categories: single-stage and two-stages. Single-stage process is done using one machine, while in a two-stage process, preforms are premade prior to the blow molding process.

In single-stage injection stretch molding parison is injected from the extruder into preform mold where the plastic is cooled to form the preform. The preform is then reheated and placed in the bottle mold. The preform is stretched by extending the core rod. Compressed air is then blown into the stretched parison to expand to the shape of the mold. The blown container is then cooled and ejected.

In the two-stage process, premade preforms are placed in preform heaters to allow them to soften. The mold is opened allowing softened preform to be inserted, after which the mold is closed. The preform is then stretched as described above. Compressed air is then blown into the stretched preform to expand to the shape of the mold. More specifically, just prior to the stretch rod reaching its full stroke, low pressure air (i.e., preblow cycle) is introduce through the blow nozzle to ensure the heated preform does not stick to the stretch rod. After the preblow cycle is complete, high pressure air is introduced through the same blow nozzle to fully expand the preform to the shape of the mold. The container is then cooled and ejected. The two-stage or reheat injection stretch blow molding process completely separates the preform injection molding operation from the blow molding operation. For example, the two operations may be carried out in different locations by different manufacturers, with a substantial time interval between them.

Injection stretch blow molding processes use hollow preforms produced by injection molding. The preform is short and thick-walled relative to the finished blown article. The neck profile complete with screw thread is entirely formed by injection molding and is not modified by the blowing process. The other end of the preform is closed and typically dome shaped. Further, the design and precision of the preform has a critical influence on the degree of orientation and quality of the blown article. The actual wall thickness and any profiling depends on the shape and size of the blown container. Like other preform processes, the finished blown article is free of seams, flash, and pinch-off scrap, and is characterized by precise neck dimensions. The injection molded preform may be converted to a blow molding either by the single-stage or the two-stage process.

Embodiments disclosed herein are related to the blowing stage of the above-mentioned injection or injection stretch blow molding processes. More specifically, embodiments disclosed herein are directed to an improved stretch rod with one or more apertures configured to allow compressed air to be blown into the preform through the stretch rod itself, to obtain a blown container.

The preform may consist of any plastics suitable for the injection blow molding or injection stretch blow molding process. For example, such plastics may include PET (polyethylene terephthalate), PET-G, HDPE, PP, PVC, or also a filled plastic.

As shown in FIG. 1, a stretch rod (100) is depicted. In FIG. 1, the stretch rod (100) is fully extended. The stretch rod is a vertical structure made of metal, the bottom end of which may be inserted into the opening of a preform (102). The stretch rod (100) may be cylindrical, rectangular or any other suitable configuration in shape. In one or more embodiments, as shown in FIG. 1, the stretch rod is inserted into the preform (102) at the threaded neck portion (120) of the preform, and travels all of the way into the preform, such that the stretch rod directly contacts the curved bottom end of the preform (104). The stretch rod (100) then continues to stretch the preform to the base of the blow mold. In one or more embodiments, the stretch rod (100) may be a multistage stretch rod inserted into the preform. The multi-stage stretch rod includes a first stage stretch rod body that extends a first distance, and a second stage stretch rod body having a diameter smaller than the first stage stretch rod body that extends from an end of the first stretch rod body.

In one or more embodiments, the stretch rod (100) has one or more apertures. Apertures may be any type of opening, gap or hole. For example, in FIG. 1, the apertures are shown as several slots (106) formed in the top part, or the handle pocket zone (110) of the stretch rod (100). The handle pocket zone (110) may encompass the portion of the stretch rod (100) that falls between the upper attachment point (112) and the lower attachment point (114) of the integral handle of the preform. An integral handle is one that is movable from a first position to a second position when the preform is blown such that the handle remains completely integrated and attached at one or both ends with the blown container that results from blowing the preform.

In one or more embodiments, multiple slots (106) may be formed in the handle pocket zone (110) of the stretch rod (100) such that the slots are present all of the way around the circumference of the stretch rod (100). Thus, for example, although not shown, there may be a line of four slots all the way around the stretch rod, resulting in a total of 12 or 16 slots in the handle pocket zone (110) of the stretch rod (100).

Figure 2:
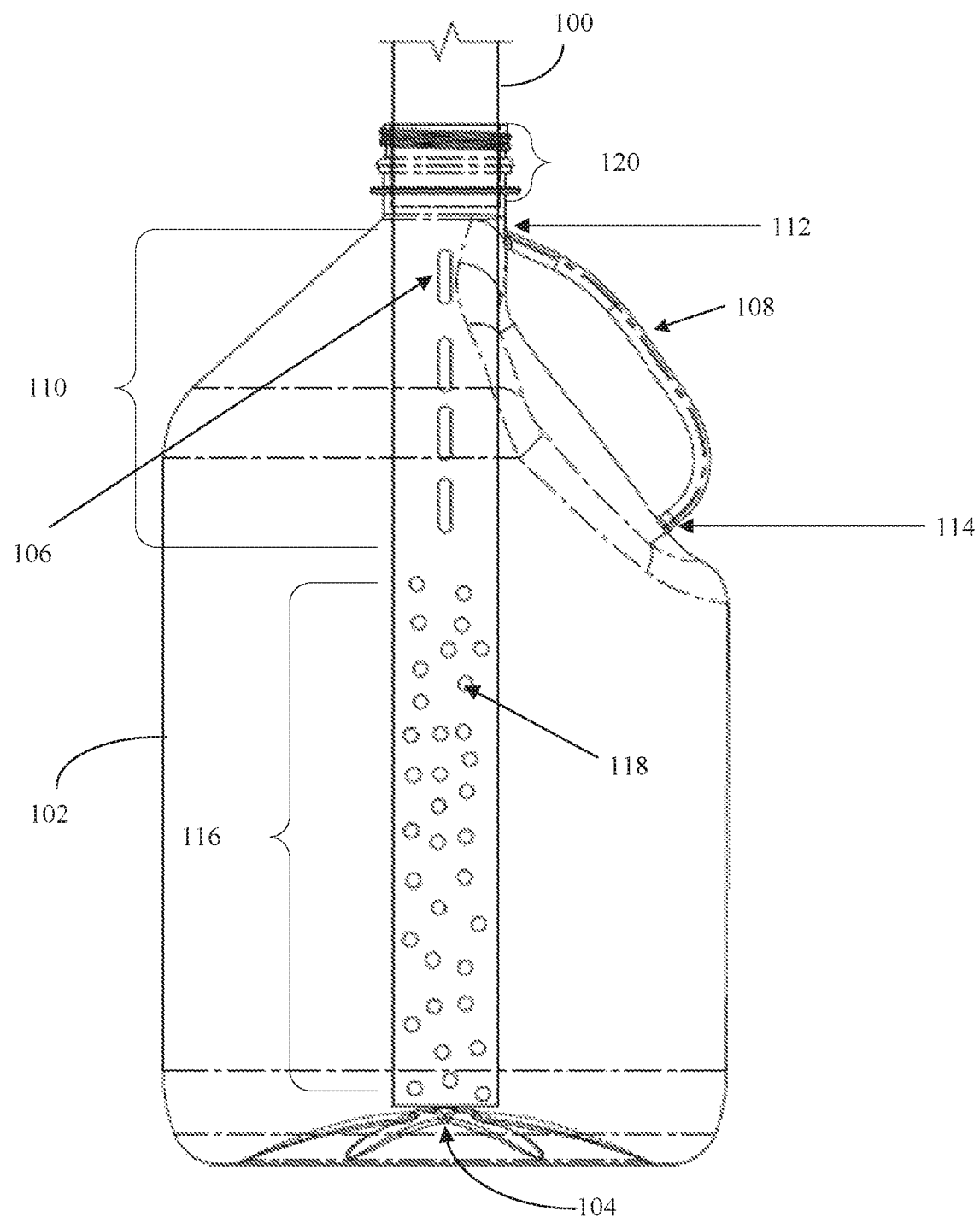
FIG. 2 shoes a stretch rod with slots and a plurality of holes inserted into a preform in accordance with one or more embodiments disclosed herein.

Those skilled in the art will appreciate that although there are four slots (106) shown in FIG. 1, the number of slots and type of aperture may vary without departing from the scope disclosed herein. For example, the slots may instead be holes as shown in FIG. 2, or any other aperture/opening type having any suitable shape and size. Further, the slots may not be aligned as shown in FIG. 1, but rather, may be randomly arranged all around the circumference of the stretch rod (100). Thus, the apertures in the stretch rod (100) may be patterned, random, aligned, unaligned, or in any other suitable arrangement. Further, in one or more embodiments, although the stretch rod (100) is shown in FIG. 1 as being inserted into a preform (102) having an integral handle (108), a stretch rod in accordance with embodiments disclosed herein may be used to blow air into a preform that does not include a handle, for example, a straight, smooth sided bottle that holds water or any other suitable substance.

In one or more embodiments, if the apertures of the stretch rod (100) are arranged in some pattern, this pattern may be determined by the air requirements to blow the preform into a certain bottle shape. Thus, the alignment, pattern, or random arrangement of the stretch rod may be determined based on what shape is ultimately desired and where the compressed air has to travel to first to achieve the desired shape. For example, in one or more embodiments, the slots (106) formed in the stretch rod may be larger, aligned, or angled so that the compressed air forms the shelf of the container first. The shelf of the container is the angular section between the upper attachment point (112) and the lower attachment point (114) of the integral handle (108). The compressed air may blow to form the shelf first, and subsequently blows straight downward to form the remainder of the container to the curved, semi-spherical end at the bottom (104). In alternate embodiments, both the shelf and the portion of the container below the shelf may be blown simultaneously.

FIG. 2 shows the same components described above with respect to FIG. 1, and provides further detail of the apertures in the stretch rod (100). As with FIG. 1, the stretch rod (100) is inserted into the preform (102) in FIG. 2, until the bottom of the stretch rod (100) directly contacts the curved, semi-spherical end portion (104) at the bottom of the preform (102). The stretch rod continues to stretch the preform until the preform contacts the mold base. In FIG. 2, the stretch rod (100) has an optional zone (116), located below the handle pocket zone (110). This zone (116) may optionally contain more apertures, such as the randomly patterned plurality of holes (118) shown in FIG. 2. The plurality of holes (118) may be any size, and may not be uniform in size across all of the holes (118). Thus, while FIG. 2 shows each of the plurality of holes (118) as being smaller in size than one of the slots (106), the plurality of holes (118) may each be larger than a single slot of the slots (106) in the handle pocket zone (110). Further, the plurality of holes (118) may be randomly dispersed around the circumference of the stretch rod (100) or may be patterned or aligned in straight lines around the circumference of the stretch rod. Alternatively, the plurality of holes (118) may be on only one side of the stretch rod, without continuing around the entire circumference of the stretch rod (100). The plurality of holes (118) in the optional zone (116) of the stretch rod (100) may be of any number and any size, without departing from the scope of this disclosure.

Again, those skilled in the art will appreciate that although FIG. 2 shows a plurality of randomly arranged holes (118), the optional zone (116) of the stretch rod (100) may include any type of apertures that are patterned, unpatterned, aligned, angled, etc. For example, both zones (110, 116) of the stretch rod (100) may include slots around the circumference of the stretch rod (100). Further, for example, the slots in the handle pocket zone (110) may be larger than those in the optional zone (116). Further, those skilled in the art will appreciate that although FIG. 2 delineates two zones of the stretch rod body with apertures, the body of the stretch rod may be considered as one zone, where different shapes, sizes, and types of apertures are formed on the entire body of the stretch rod, without having any division of zones associated with different aperture characteristics.

Figure 3:
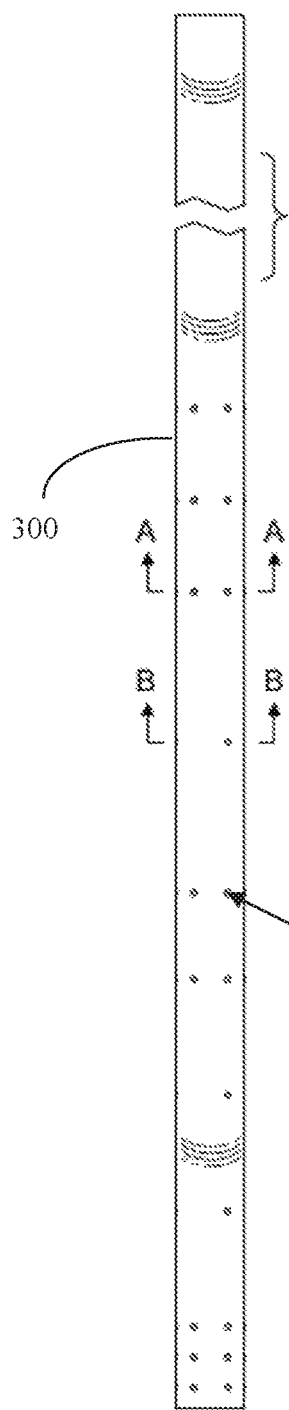
FIG. 3 shows a side view of a stretch rod with a patterned plurality of holes in accordance with one or more embodiments disclosed herein.

FIGS. 3-7 show various embodiments of a stretch rod with apertures in accordance with embodiments disclosed herein. FIG. 3 shows a stretch rod (300) with a patterned plurality of holes (302). More specifically, FIG. 3 shows a side view of the stretch rod (300) and cross sections A-A and B-B. As shown in FIG. 3 the stretch rod may be of indefinite length which is shown by the break away lines in FIG. 3. The plurality of holes (302) are aligned and run through both the handle pocket zone and the option zone of the stretch rod (300). Although FIG. 3 shows a plurality of holes, the stretch rod may have any type of opening/aperture not limited to the holes shown in FIG. 3. Further, the alignment of the holes in FIG. 3 is vertical, but the holes may be patterned in any shape or form, including a horizontal alignment, without departing from the scope disclosed herein.

Figure 4:
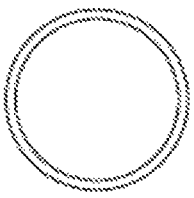
FIG. 4 shows a top/bottom view of the stretch rod of FIG. 1 in accordance with one or more embodiments disclosed herein.

FIG. 4 shows the top/bottom view of the stretch rod, in which case only the circular top or bottom part, in which a hole exists, of the hollow stretch rod may be seen.

Figure 5:
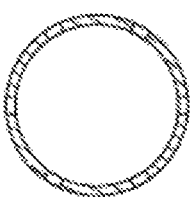
FIG. 5 shows cross section A-A of the stretch rod of FIG. 1 in accordance with one or more embodiments disclosed herein.
Figure 6:
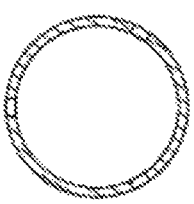
FIG. 6 shows cross section B-B of the stretch rod of FIG. 1 in accordance with one or more embodiments disclosed herein.

FIG. 5 shows the cross-section view across A-A of FIG. 3. FIG. 6 shows the cross-section view across B-B of FIG. 3.

Figure 7:
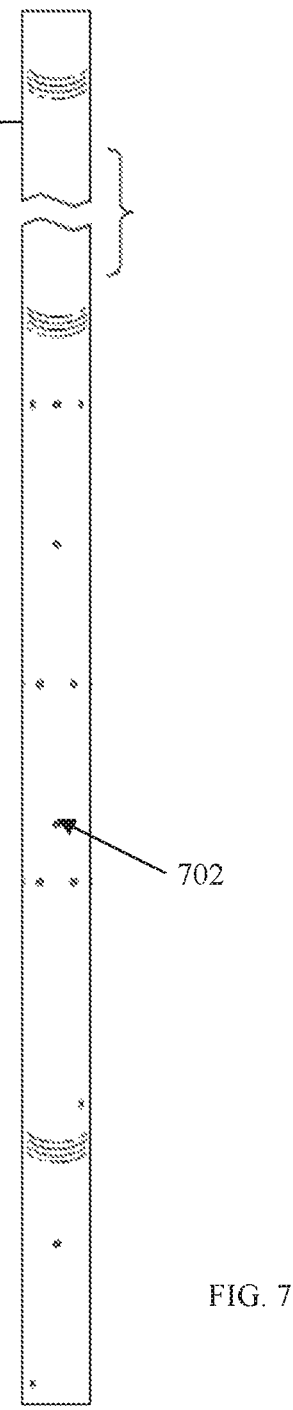
FIG. 7 shows a randomly patterned stretch rod in accordance with one or more embodiments disclosed herein.

FIG. 7 shows a stretch rod (700) with a randomly dispersed plurality of holes (702). In other words, the plurality holes in FIG. 7 are not uniformly distributed and instead are randomly positioned over the stretch rod. Although FIG. 7 shows a plurality of holes, the stretch rod may have any type of opening/aperture not limited to the holes shown in FIG. 7.

Figure 8:
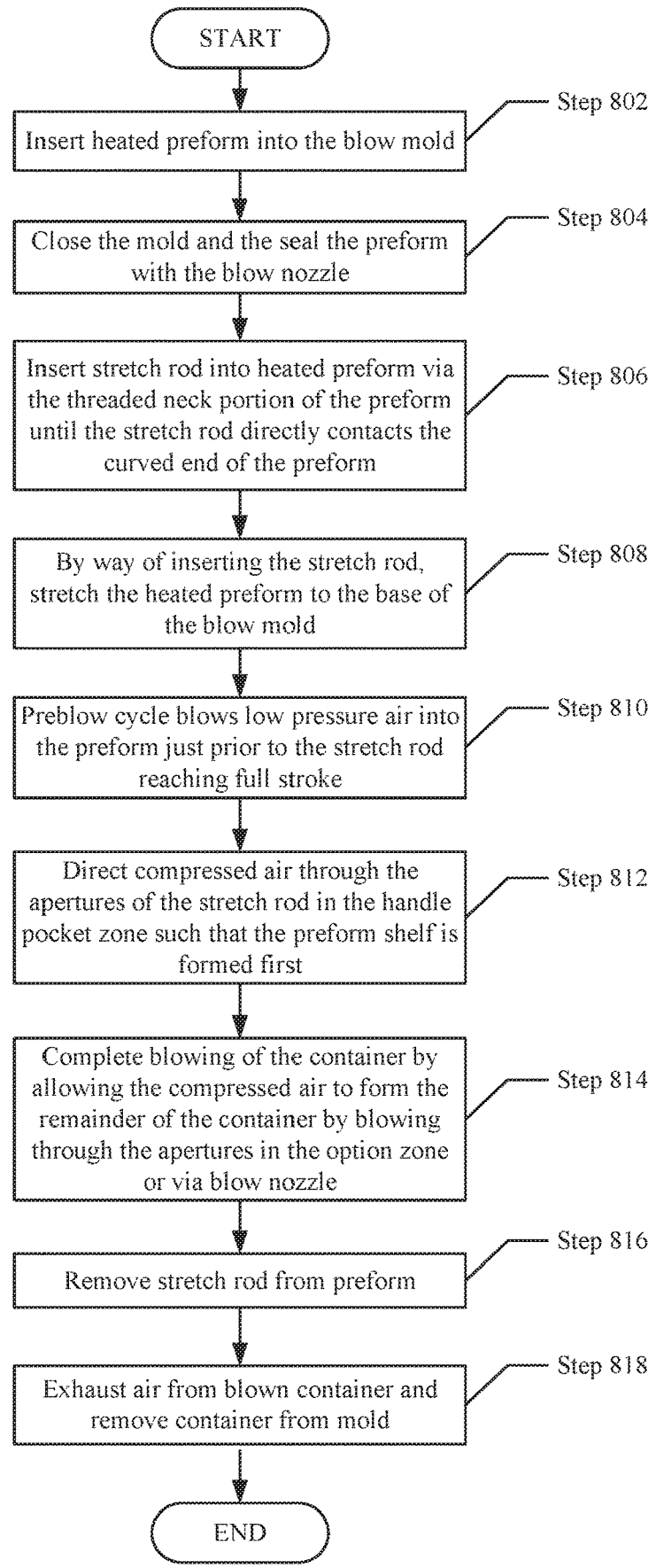
FIG. 8 shows a flow chart for blowing a preform using a stretch rod in accordance with one or more embodiments disclosed herein.

FIG. 8 shows a flow chart for blowing a preform using a stretch rod as shown and described in FIGS. 1-7 above. Specifically, FIG. 8 describes a method for blowing a preform into a container using a stretch rod in accordance with one or more embodiments. One or more blocks in FIG. 8 may be performed by one or more components as described above in FIGS. 1-7. One of ordinary skill in the art will appreciate that some or all of the blocks may be executed in a different order, may be combined or omitted, and some or all of the blocks may be executed in parallel. Furthermore, the blocks may be performed actively or passively.

Initially, in Step 802, a heated preform is inserted into the blow mold. The mold is then closed and the heated preform is sealed with the blow nozzle inserted into the threaded neck portion of the preform in Step 804.

In Step 806, the stretch rod is inserted into the heated preform via the threaded neck portion of the preform all the way down until the bottom of the stretch rod directly contacts the curved, semi-spherical end portion of the preform as shown in FIGS. 1-2 above. As the stretch rod is inserted, the preform is stretch to its container length and to the base of the blow mold (Step 808). Specifically, in one or more embodiments, once a catch secures the neck portion 719 of the preform, the stretch rod body extends upwards through the hole in the ring-shaped protrusion of the preform. As the stretch rod body extends upwards, the tip of the stretch rod body pushes on the semi-spherical end portion of the preform and stretches the preform, which has been heated in first and second ovens, to form a stretched preform.

In one or more embodiments, the stretched preform has a main body, a threaded neck portion, and a semi-spherical end portion formed at the bottom of the stretched preform, with an end transition therebetween.

In Step 810, a preblow cycle is performed in which low pressure air is blown into the preform to prevent the preform from sticking to the stretch rod. More specifically, just prior to the stretch rod reaching its full stroke, low pressure air (preblow) is introduce through the blow nozzle to ensure the heated preform does not stick to stretch rod. After the preblow cycle is complete, high pressure air is introduced through the same blow nozzle to fully expand the preform to the shape of the mold. That is, in Step 812, compressed air is directed through the apertures of the stretch rod in the handle pocket zone, between the upper attachment point and the lower attachment point of the integral handle of the preform. The compressed air may be blown through slots, holes or any other suitable opening(s) in the handle pocket zone of the stretch rod. The apertures in the handle pocket zone of the stretch rod may be randomly distributed across the circumference of the stretch rod, or patterned in a particular alignment, shape, or other suitable manner There may be any number of apertures of any suitable size, and the sizes may or may not be uniform. In this manner, the container shelf is formed before the remainder of the container is blown, because the compressed air travels between the upper and lower attachment points through the apertures of in the handle pocket zone before reaching the lower apertures in the optional zone of the stretch rod.

In Step 814, the remainder of the container is blown, either via the same aperatures of the handle pocket portion in Step 812, or via additional apertures in the optional zone of the stretch rod, or in alternate embodiments, via the blow nozzle. The additional apertures of the stretch rod may be different than or the same as those in the handle pocket portion, may be of any size, and may be of any suitable shape for an opening through which compressed air is blown. In one or more embodiments, the container may be blown by directing compressed air through both zones and all of the different types of apertures simultaneously.

In Step 816, the stretch rod may be removed from the preform, once the container is formed by the compressed air blowing method of FIG. 8. Finally, in Step 818, the air is exhausted from the blown container, and the container is removed from the mold.

Embodiments disclosed herein allow a heated preform to be stretch and blown by the same apparatus, namely, a stretch rod with a plurality of apertures for delivering compressed air to the heated preform, thereby blowing the preform into a container. No other apparatus for blowing air into the preform, such as a blow nozzle, or any other device is necessary with the stretch rod with apertures described herein. However, in some instances, the blow nozzle may be used in conjunction with the aperatured stretch rod for blowing the container.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A stretch rod for blowing a preform into a container, the stretch rod comprising:
   a hollow, cylindrical body that is made of metal;
   a first plurality of apertures; and
   a second plurality of apertures,
   the body of the stretch rod comprising a handle pocket zone comprising the first plurality of apertures and an optional zone disposed on the stretch rod below the handle pocket zone, the optional zone comprising the second plurality of apertures,
   wherein compressed air is blown through the first plurality of apertures and the second plurality of apertures of the stretch rod to form the container.

2. The stretch rod of claim 1, wherein the first plurality of apertures comprise slots, and the second plurality of apertures comprise holes.

3. The stretch rod of claim 2, wherein the plurality of slots is evenly distributed around a circumference of the stretch rod.

4. The stretch rod of claim 2, wherein the plurality of slots are aligned vertically.

5. The stretch rod of claim 2, wherein the plurality of slots are randomly distributed around a circumference of the stretch rod.

6. The stretch rod of claim 2, wherein a number of slots is less than a number of holes, and wherein the holes are smaller in size than the plurality of slots.

7. A method for blowing a heated preform into a container, comprising:
   inserting a stretch rod into the heated preform until the bottom of the stretch rod directly contacts a curved, semi-spherical end portion of the preform;
   as the stretch rod is inserted, stretching the preform to its container length until the preform touches a base of a blow mold in which the preform is encompassed;
   directing compressed air through a first plurality of apertures of the stretch rod in a handle pocket zone, between an upper attachment point and a lower attachment point of an integral handle of the preform, forming a shelf of the container; and
   directing compressed air through a second plurality of apertures of the stretch rod in an optional zone disposed below the handle pocket zone, forming a remainder of the container from the preform.

8. The method of claim 7, wherein the first plurality of apertures comprise slots, and the second plurality of apertures comprise holes.

9. The method of claim 7, wherein the first plurality of apertures is the same size and shape as the second plurality of apertures.

10. The method of claim 8, wherein the plurality of slots are aligned vertically and evenly distributed around a circumference of the stretch rod.

11. The method of claim 8, wherein the plurality of slots are randomly distributed around a circumference of the stretch rod.

12. The method of claim 8, wherein a number of slots is less than a number of holes, and wherein the holes are smaller in size than the plurality of slots.

13. The method of claim 7, further comprising: prior to directing compressed air into the stretch rod, a preblow cycle in which low pressure air is blown via a blow nozzle into the heated preform to prevent the preform from sticking to the stretch rod.

14. The method of claim 7, further comprising: obtaining a blown container as a result of the method; and removing the blown container from the mold.

15. A method for blowing a preform into a container, comprising:
   heating the preform to obtain a heated preform;
   inserting the preform into a blow mold and closing the blow mold such that the blow mold encompasses the preform;
   inserting a stretch rod into the heated preform until the bottom of the stretch rod directly contacts a curved, semi-spherical end portion of the preform;
   as the stretch rod is inserted, stretching the preform until the preform touches a base of the blow mold;
   directing low pressure air, in a preblow cycle, through a blow nozzle that seals the heated preform; and
   directing high pressure compressed air through a plurality of apertures arranged on the stretch rod to obtain a blown container,
   wherein the plurality of apertures are arranged uniformly in two regions of the stretch rod, wherein a first subset of the plurality of apertures are shaped as slots and located in a handle pocket zone of the preform, and a second subset of the plurality of apertures are circular holes located in the optional zone below the handle pocket zone of the preform.

16. The method of claim 15, wherein the blown container comprises an integral handle.

17. The method of claim 15, wherein the plurality of apertures are arranged randomly over the stretch rod, wherein a first subset of the plurality of apertures are slots, and a second subset of the plurality of apertures are circular holes.

18. An apparatus comprising:
- a heated preform;
- a blow mold for receiving the heated preform;
- a blow nozzle for sealing the heated preform in the blow mold; and
- a stretch rod comprising:
  - a hollow, cylindrical body that is made of metal; and a first plurality of apertures arranged on the body of the stretch rod,
  - wherein compressed air is blown through the first plurality of apertures to form a blown container,
  - wherein the body of the stretch rod comprises a handle pocket zone with the first plurality of apertures and an optional zone disposed on the stretch rod below the handle pocket zone, the optional zone comprising a second plurality of apertures, wherein the compressed air is blown through the first plurality of apertures and the second plurality of apertures simultaneously.

\* \* \* \* \*